(12) United States Patent
Lopez

(10) Patent No.: US 9,509,631 B2
(45) Date of Patent: Nov. 29, 2016

(54) QUALITY OF SERVICE (QOS) FOR INFORMATION CENTRIC NETWORKS

(71) Applicant: Telefonaktiebolaget L M Ericsson (publ), Stockholm (SE)

(72) Inventor: Carlos Valencia Lopez, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 128 days.

(21) Appl. No.: 14/572,320

(22) Filed: Dec. 16, 2014

(65) Prior Publication Data

US 2016/0173410 A1    Jun. 16, 2016

(51) Int. Cl.
| | | |
|---|---|---|
| *H04J 1/16* | (2006.01) |
| *H04L 12/927* | (2013.01) |
| *H04L 29/08* | (2006.01) |
| *H04L 29/06* | (2006.01) |

(52) U.S. Cl.
CPC ............ *H04L 47/805* (2013.01); *H04L 65/80* (2013.01); *H04L 67/306* (2013.01); *H04L 67/322* (2013.01)

(58) Field of Classification Search
CPC ....... H04L 47/24; H04L 47/32; H04L 47/38; H04L 47/70; H04L 47/72; H04L 47/74; H04L 47/78; H04L 47/80; H04L 47/805
USPC ................................. 370/229–237
See application file for complete search history.

(56) References Cited

U.S. PATENT DOCUMENTS

| | | | | |
|---|---|---|---|---|
| 2003/0093515 | A1* | 5/2003 | Kauffman | ........... H04L 12/5695 709/224 |
| 2007/0008884 | A1* | 1/2007 | Tang | ........................ H04L 29/06 370/230 |
| 2013/0166668 | A1 | 6/2013 | Byun et al. | |

OTHER PUBLICATIONS

Khan et al, QoS Aware Path Selection in Content Centric Networks, IEEE 2012. (From Applicant's IDS Apr. 8, 2016).*
Marc Mosko, CCNx 1.0 Protocol Specification Roadmap, Apr. 14, 2014. (From Applicant's IDS Mar. 13, 2015).*
Smetters et al. CCNx (Pre 1.0) Access Control Specifications, PARC Jul. 30, 2010 (From Applicant's IDS Apr. 8, 2016).*
Ali, Z., et al., "Node-IDS Based Resource Reservation Protocol (RSVP) Hello: A Clarification Statement", Network Working Group; RFC 4558; Jun. 2006; 7 pages.
Andersson, L., et al., "LDP Specification", Network Working Group; RFC 5036; Oct. 2007; 135 pages.
Awduche, D., et al., "RSVP-TE: Extensions to RSVP for LSP Tunnels", Network Working Group; RFC 3209; Dec. 2001; 61 pages.

(Continued)

*Primary Examiner* — Mang Yeung
(74) *Attorney, Agent, or Firm* — Nicholson, De Vos, Webster & Elliot, LLP

(57) ABSTRACT

A method is implemented for enforcing quality of service (QOS) for accessing content objects on a per user basis at a content centric networking (CCN) gateway in a CCN network. The method receives a CCN interest packet including a name for a content object from a user equipment. An expected size of the content object is determined. An estimated bandwidth usage for a user is calculated based on the expected size of the content object. The estimated bandwidth usage for the user is compared with a permitted bandwidth in a QOS profile of the user. The CCN interest packet is processed, in response to the estimated bandwidth being less than the permitted bandwidth in the QOS profile of the user.

20 Claims, 8 Drawing Sheets

(56) References Cited

OTHER PUBLICATIONS

Babiarz, J., et al., "Configuration Guidelines for DiffServ Service Classes", Network Working Group; RFC 4594; Aug. 2006; 57 pages.
Baker, F., et al., "A Differentiated Services Code Point (DSCP) for Capacity-Admitted Traffic", Internet Engineering Task Force (IETF); RFC 5865; May 2010; 14 pages.
Baker, F., et al., "Management Information Base for the Differentiated Services Architecture," Network Working Group; RFC 3289; Copyright The Internet Society (2002). May 2002; 116pg.
Berger, L., "Generalized Multi-Protocol Label Switching (GMPLS) Signaling Resource ReserVation Protocol-Traffic Engineering (RSVP-TE) Extensions", Network Working Group; RFC 3473; Jan. 2003; 42 pages.
Bernet, Y., et al., "An Informal Management Model for Diffserv Routers", Network Working Group; RFC 3290; May 2002; 56 pages.
Black, D., "Differentiated Services and Tunnels", Network Working Group; RFC 2983; Oct. 2000; 14 pages.
Black, D., et al., "Per Hop Behavior Identification Codes", Network Working Group; RFC 3140; Jun. 2001; 8 pages.
Blake, S., et al., "An Architecture for Differentiated Services", Network Working Group; RFC 2475; Dec. 1998; 36 pages.
Borman, D., et al., "IPv6 Jumbograms", Network Working Group; RFC 2675; Aug. 1999; 9 pages, Copyright The Internet Society 1999.
Braden, et al., "Resource ReSerVation Protocol (RSVP)—Version 1 Functional Specification", Network Working Group, Request for Comments: 2205, (Sep. 1997), 112 pages.
Chan, K., et al., "Differentiated Services Quality of Service Policy Information Base", Network Working Group; RFC 3317; Mar. 2003; 96 pages.
Charny, A., et al., "Supplemental Information for the New Definition of the EF PHB (Expedited Forwarding Per-Hop Behavior)", Network Working Group; RFC 3247; Mar. 2002; 24 pages.
Coltun, R., et al., "OSPF for IPv6", Network Working Group, Request for Comment: 5340, Jul. 2008, 94 pages.
Davie, B., An Expedited Forwarding PHB (Per-Hop Behavior), Network Working Group; RFC 3246; Copyright The Internet Society (2001); Mar. 2002; 16pgs.
Deering, S., et al., "Internet Protocol, Version 6 (IPv6) Specification", Network Working Group; RFC 2460; Dec. 1998; 39 pages.
Edens, Glenn, The Hitchhiker's Guide to CCN, CCNx (Pre 1.0) Access Control Specifications, PARC. Jun. 30, 2010.
Eggert, L., et al., "Unicast UDP Usage guidelines for Application Designers", Network Working Group; RFC 5405; Nov. 2008; 27 pages.
Fenner, B., et al., "Management Information Base for the User Datagram Protocol (UDP)", Network Working Group; RFC 4113; Jun. 2005; 19 pages.
Grossman, D., "New Terminology and Clarifications for Diffserv", Network Working Group; RFC 3260; Apr. 2002; 10 pages.
Hedrick, C., "Routing Information Protocol", Network Working Group, Request for Comments: 1058, (Jun. 1988), 33 pages.
Heinanen, J., et al., "Assured Forwarding PHB Group", Network Working Group; RFC 2597; Jun. 1999; 11 pages.

Housley, R., et al., "Using Advanced Encryption Standard (AES) CCM Mode with IPsec Encapsulating Security Payload (ESP)", Network Working Group; RFC 4309; Dec. 2005; 13 pages.
Kent, S., et al., "Security Architecture for the Internet Protocol", Network Working Group; RFC 4301; Dec. 2005; 101 pages.
Kompella, K., et al., "Procedures for Modifying the Resource reSerVation Protocol (RSVP)", Network Working Group; RFC 3936; Oct. 2004; 7 pages.
Malkin, G., et al., "RIP Version 2", Network Working Group; RFC 2453; Nov. 1998; 39 pages.
Malkin, G., et al., "RIPng for IPv6", Network Working Group; RFC 2080; Jan. 1997; 19 pages.
Mosko, Marc, "CCNx 1.0 Protocol Specification Roadmap", PARC; Apr. 14, 2014 (rev 3); 4 pages.
Moy, J., "OSPF Version 2", Network Working Group; RFC 2328; Apr. 1998; 204 pages.
Nichols, K., et al., "Definition of Differentiated Services Per Domain Behaviors and Rules for their Specification", Network Working Group; RFC 3086; Apr. 2001; 24 pages.
Nichols, K., et al., "Definition of the Differentiated Services Field (DS Field) in the IPv4 and IPv6 Headers", Network Working Group; RFC 2474; Dec. 1998; 20 pages.
Oran, David, "OSI ISIS Intradomain Routing Protocol", Network Working Group, Request for Comments: 1142, (Feb. 1990), 157 pages.
Polk, J., et al., "A Resource Reservation Protocol (RSVP) Extension for the Reduction of Bandwidth of a Reservation Flow", Network Working Group; RFC 4495; May 2006; 21 pages.
Postel, J., "User Datagram Protocol", Aug. 28, 1980, 3 pages, RFC 768.
Rekhter, Y., et al., "A Border Gateway Protocol 4 (BGP-4)", Network Working Group; RFC 4271; Jan. 2006; 104 pages.
Rosen, E., et al., "BGP/MPLS IP Virtual Private Networks (VPNs)", RFC4364, Feb. 2006, the whole document.
Shenker, S., et al., "Specification of Guaranteed Quality of Services", Network Working Group; RFC 2212; Sep. 1997; 20 pages.
Wroclawski, J., "Specification of the Controlled-Load Network Element Service", Network Working Group, Request for Comments: 2211, (Sep. 1997), 19 pages.
Wroclawski, J., "The Use of RSVP with IETF Integrated Services", Network Working Group, Request for Comments: 2210, (Sep. 1997), 33 pages.
3GPP TS 32.426 V9.1.0: "Telecommunication management; Performance Management (PM); Performance measurements Evolved Packet Core (EPC) network," (Release 9); 3rd Generation Partnership Project; Technical Specification Group Services and System Aspects; Sep. 2009, 47 pages.
Elkotob, et al., "Challenges and Opportunities in Content Distribution Networks: A Case Study," 2012 IEEE Globecom Workshops, Gc'12 Workshops, Dec. 3-7, 2012, 6 pages.
Khan, et al., "QoS Aware Path Selection in Content Centric Networks," IEEE International Conference on Communications (ICC), Jun. 10-15, 2012, pp. 2645-2649.
Postel, J., RFC 793, "Transmission Control Protocol," DARPA Internet Program Protocol Specification, Sep. 1981, 91 pages.
Smetters, et al., "CCNx (Pre 1.0) Access Control Specifications," Palo Alto Research Center (PARC), Jul. 30, 2010, 24 pages.
Socolofsky, et al., RFC 1180, "A TCP/IP Tutorial," Network Working Group, Request for Comments, Jan. 1991, 28 pages.

\* cited by examiner

QUALITY OF SERVICE (QOS) FOR INFORMATION CENTRIC NETWORKS

FIELD

Embodiments of the invention relate to enforcing quality of service (QoS) for requesting content in information centric networking (ICN) networks. Specifically, the embodiments relate to a method and system implemented by a content centric networking (CCN) gateway to enforce QoS policies on a per user basis.

BACKGROUND

An ICN network is a conceptualization of a networking protocol stack, in particular layers 3 and above of a network protocol stack. The CCN network as well similar networks like named data networking (NDN) networks are particular architectures and implementation of an ICN network. ICN networks, CCN and NDN networks are based on the premise of naming resources in these networks. In particular, the naming relates to the use of a globally shared namespace for objects that allows entities in these networks to retrieve any content of interest. NDN networks and CCN networks have similar architectures, thus for sake of clarity examples related to CCN networks are discussed herein below.

Thus, within a CCN network a name is utilized to identify a content object instead of an Internet Protocol (IP) address of the host of the content. In an IP network, routing is based on host names (e.g., source and destination addresses). In a CCN network by contrast, routing is based on a uniform resource identifier (URI) or similar identifier for a content object. CCN routing is performed hop-by-hop, using a longest prefix matching on the CCN name. All communications seeking to access data are framed as a request and response transaction. A CCN client sends a message referred to as a CCN interest to the nodes in the CCN. The nodes of the CCN network respond with a content object identified by a CCN name in the CCN interest. These CCN content objects are returned via a CCN response.

All content object packets are cryptographically signed by their initial provider. A CCN client can thus verify the integrity and authenticity of the content even if the packet comes from untrusted links or untrusted hosts. As a direct effect, CCN nodes in the CCN network are allowed to cache packets locally in a table called the content store. When a CCN network node receives a CCN interest packet, it can check whether its local content store has the requested content object and can send it back if found. The look up in the content store is by the CCN name. If the CCN name is not found in the local content store, then the CCN interest is forwarded according to entries for the CCN name in a forwarding information base (FIB) of the CCN network node.

SUMMARY

A method is implemented for enforcing quality of service (QOS) for accessing content objects on a per user basis at a content centric networking (CCN) gateway in a CCN network. The method receives a CCN interest packet including a name for a content object from a user equipment. An expected size of the content object is determined. An estimated bandwidth usage for a user is calculated based on the expected size of the content object. The estimated bandwidth usage for the user is compared with a permitted bandwidth in a QOS profile of the user. The CCN interest packet is processed, in response to the estimated bandwidth being less than the permitted bandwidth in the QOS profile of the user.

In another embodiment, a network device implements a method for enforcing quality of service (QOS) for accessing content objects on a per user basis at a content centric networking (CCN) gateway in a CCN network. The network device comprises a non-transitory computer-readable medium having stored therein a length prediction module and a QOS module and a network processor coupled to the non-transitory computer-readable medium. The network processor is configured to execute the length prediction module and the QOS module. The QOS module is configured to receive a CCN interest packet including a name for a content object from a user equipment. The length prediction module is configured to determine an expected size of the content object. The QOS module is further configured to calculate an estimated bandwidth usage for a user based on the expected size of the content object, to compare the estimated bandwidth usage for the user with a permitted bandwidth in a QOS profile of the user, and to process the CCN interest packet, in response to the estimated bandwidth being less than the permitted bandwidth in the QOS profile of the user.

In a further embodiment, a computing device implements a plurality of virtual machines for implementing network function virtualization (NFV). A virtual machine from the plurality of virtual machines is configured to execute a method for enforcing quality of service (QOS) for accessing content objects on a per user basis at a content centric networking (CCN) gateway in a CCN network. The computing device includes a non-transitory computer-readable medium having stored therein a length prediction module and a QOS module, and a processor coupled to the non-transitory computer-readable medium. The processor is configured to execute the virtual machine. The virtual machine is configured to execute the length prediction module and the QOS module. The QOS module is configured to receive a CCN interest packet including a name for a content object from a user equipment. The length prediction module is configured to determine an expected size of the content object. The QOS module is further configured to calculate an estimated bandwidth usage for a user based on the expected size of the content object, to compare the estimated bandwidth usage for the user with a permitted bandwidth in a QOS profile of the user, and to process the CCN interest packet, in response to the estimated bandwidth being less than the permitted bandwidth in the QOS profile of the user.

In one embodiment, a control plane device is configured to implement at least one centralized control plane for a software defined network (SDN). The centralized control plane device is configured to execute a method for enforcing quality of service (QOS) for accessing content objects on a per user basis at a content centric networking (CCN) gateway in a CCN network. The control plane device includes a non-transitory computer-readable medium having stored therein a length prediction module and a QOS module, and a processor coupled to the non-transitory computer-readable medium. The processor is configured to execute the length prediction module and the QOS module, the QOS module configured to receive a CCN interest packet including a name for a content object from a user equipment. The length prediction module is configured to determine an expected size of the content object. The QOS module is further configured to calculate an estimated bandwidth usage for a user based on the expected size of the content object, to compare the estimated bandwidth usage for the user with a permitted bandwidth in a QOS profile of the user, and to process the CCN interest packet, in response to the estimated bandwidth being less than the permitted bandwidth in the QOS profile of the user.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
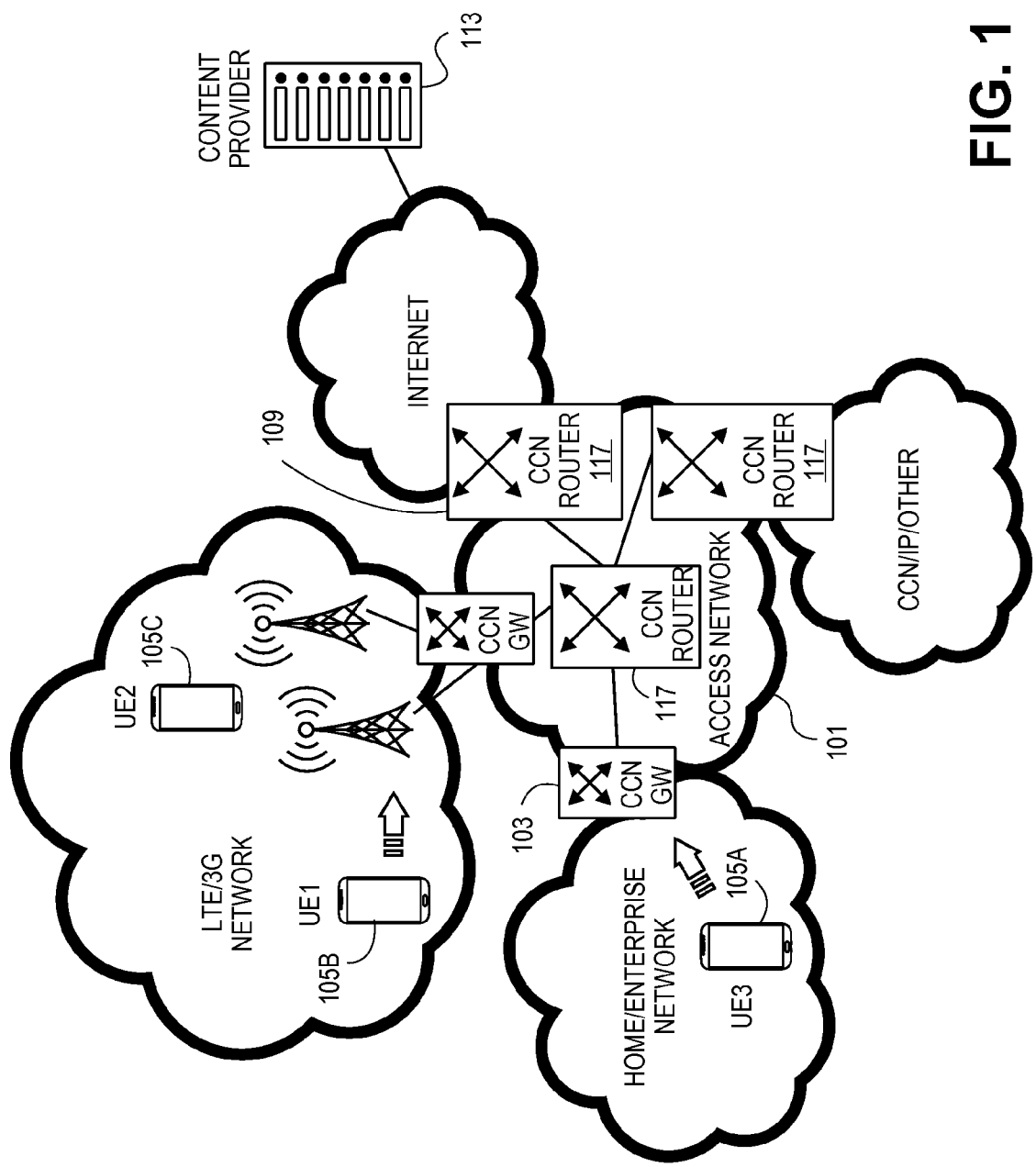
FIG. 1 is a diagram of one embodiment of a CCN network including placement of CCN gateways, CCN routers and content providers in the CCN network.

The following description describes methods and apparatus for quality of service (QoS) enforcement on a per user basis in a CCN network at CCN gateways. The methods and apparatus enable per user QoS at CCN gateways. NDN networks have similar architecture, processes and structures as those used in CCN networks. The examples and embodiments described herein relate to CCN networks, however, one skilled in the art would understand that the methods, processes, structures and functions described herein with relation to CCN networks are also applicable to NDN networks. In addition, many of the processes, methods, techniques and functions would be applicable to similar ICN networks such as network of information (NetInf), MobilityFirst, GreenICN, PURSUIT and similar ICN networks.

References in the specification to "one embodiment," "an embodiment," "an example embodiment," etc., indicate that the embodiment described may include a particular feature, structure, or characteristic, but not every embodiment may necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Overview

Quality of service is used in modern networks to set requirements on resource usage (e.g., bandwidth or data usage) in communications between a user equipment (e.g., a user computing device such as personal computer or smartphone) and a content provider or computing device. These requirements on resource usage can be either maximum or minimum values for different characteristics of the connection such as bandwidth usage, delay, jitter, packet drop or out of order delivery. QoS is used by a network provider or administrator to prioritize some data traffic over other data traffic as well as to prevent or reduce network congestion. The prioritization of data traffic can be based on various classifications of data traffic and user or subscriber level policies based on agreements between the network provider and the user.

In some embodiments, network providers utilize network devices to implement QoS solutions for mobile and fixed networks. In one example embodiment, the network devices used to implement the QoS policies are Service Aware Support Nodes (SASNs), which are responsible for enforcing the QoS requirements configured for the users. For example, SASN may be deployed in a packet core of the 3GPP mobile network or similar network to enforce the QoS.

To be able to apply QoS, the implementing network device needs to know QoS policies for each user of the network and must be able to associate all data traffic with a particular user. In mobile networks, this problem is solved following the 3GPP standard 32.426 where it describes the attach procedures where users are identified as the user equipment attaches (i.e., connects) with the network. These procedures describe the way in which any computing device has to connect to the network. Once the procedure ends successfully, the user equipment can start forwarding and receiving data traffic, which can always be associated to a particular user or subscriber. The term 'user' indicates a specific individual with an identifier unique locally or globally to that user. The term 'subscriber' refers to an entity with an account or agreement with a network provider. Multiple users can use a given subscription with a network provider, such as a household subscribing with an Internet service provider where the household has multiple individuals using the subscription.

The Evolved Packet Core (EPC) is an architecture utilized with mobile networks to provide access between these networks and various services in the EPC and access to services over the Internet. In the EPC architecture all data traffic from the user equipment destined for these services or the Internet will go through the serving gateway and/or the packet data network (PDN) gateway. Thus, QoS can be implemented at these nodes.

However, in contrast to the 3GPP and EPC architecture, an ICN network or more specifically a CCN network does not have the same architecture and operates with differing requirements that necessitate a different approach to QoS enforcement. In the case of CCN, the architecture is different because the CCN network provides the capability for pervasive caching of content objects, there is no guarantee that a single gateway, especially a northbound (i.e., upstream) gateway, will see all data traffic in the network. Thus, a more distributed approach to QoS has been developed as set forth herein to accommodate this difference in architecture.

FIG. 1 is a diagram of one example of an example architecture of a CCN network. The CCN network in this example is an access network 101. The access network 101 is in communication with a set of separately administered networks including a home/enterprise network, the Internet and an LTE/3G mobile network. The example shows that the access network can be further in communication with any number of additional CCN networks, IP networks or other types of networks. In this example, the access network implements the QoS enforcement system and processes described further herein below and is provided by way of example and not limitation. A CCN network can be utilized in other contexts such as home networks, enterprise networks, or similar independently administered public or private networks.

The access network can have any number of nodes and can utilize any combination of layer 1 and layer 2 protocols for communication between the CCN nodes of the access network 101. For sake of clarity, the nodes implementing the QoS system are shown and described. The CCN nodes are network devices (ND), as discussed further herein below. The CCN nodes include a set of CCN routers 117 and CCN gateways (GW) 103. The CCN routers 117 manages CCN interest packets, forwarding these packets toward the corresponding content provider 113 and managing the content response messages by forwarding them toward the requesting user equipment 105A-C.

The CCN nodes that communicate with the user equipment 105A-C in the separately administered networks are the CCN gateways 103. The user equipment 105A-C can be any type of user device including mobile devices, laptop computers, desktop computers, console devices, workstations and similar computing devices. The CCN gateways 103 identify users of the user equipment 105A-C and apply the QoS policies on a per user basis using the user identification information obtained from the user equipment 105A-C and the networks of the user equipment 105A-C. The process for QoS implemented by the CCN gateways 103 is discussed further herein below.

The content provider 113 can be any computing device in communication with the access network 101. The access network 101 can be in communication with any number and variety of content providers 113. The content provider 113 can be a server or similar computing device that hosts a set of services and resources such as data stores including web pages, audio/visual content, documents and similar static and/or dynamically generated data.

Figure 2:
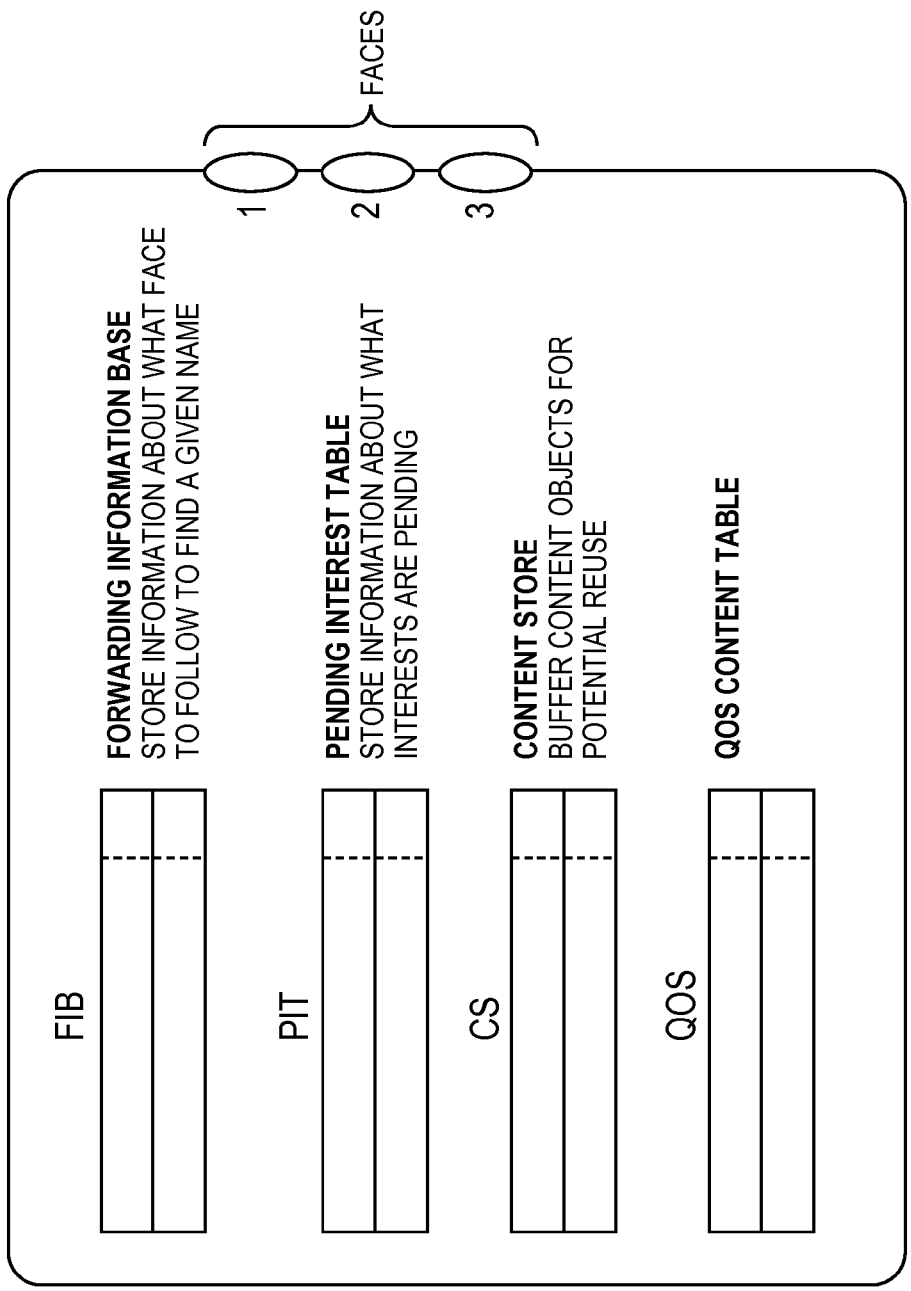
FIG. 2 is a diagram of one embodiment of an example set of data structures maintained by a CCN gateway node.

FIG. 2 is a diagram of one embodiment of the set of data structures maintained by CCN nodes. The CCN nodes such as CCN routers and CCN gateways maintain three or four sets of tables for tracking information related to CCN. In prior systems, only three tables were typically maintained. The existing CCN tables include the forwarding information base (FIB), the pending interest table (PIT) and the content store (CS). In some embodiments, a fourth table can be maintained in the form of a user content table (UC). The FIB is equivalent to the routing table in IP, where destination addresses and networks for particular content objects identified by CCN names are matched with an output interface. In CCN, the IP prefixes utilized for matching on the routing table are replaced with content name prefixes of the CCN names.

The PIT stores the CCN interest packets that have been received, but that have not been responded to yet. The entries of these CCN interest packets are referred to as 'pending interests' and are removed from the PIT when a corresponding content object is sent toward the originating user equipment that generated the CCN interest packet via the associated ingress port or when the pending interest times out.

The CS is an optional local cache of content objects. This cache is optional and can have any size or store any number of content objects. CCN nodes can choose not to cache anything (for example in a core network where cache size would need to be huge in order to maximize cache hits). In one embodiment, the CS stores a set of recently received content objects.

In one embodiment, a QoS table is maintained that includes an entry for each known user or a recent subset of these users that has generated a CCN interest packet that was received by the CCN node. Each entry in the QoS table can correspond to a user and include a user or subscriber field to identify a user by a user identifier such as an ingress network interface, a media access control (MAC) address or similar local or globally unique identifier. Each entry can also include a bandwidth field that identifies a last measured bandwidth for the user or subscriber. A third field can include a time of a last packet arrival for the user or subscriber. User or subscriber information including user or subscriber identifiers can be retrieved from subscriber services in the network of the user such as AAA, RADIUS and similar subscriber services. The information in the QoS table can be encoded using any system or format. In some embodiments, this format is left open to enable local optimization. In one example, bandwidth metrics can be encoded as a bit per second or similar measurement. In other embodiments, other metrics are tracked on a per user or subscriber basis for use in QoS enforcement such a total data usage, data or bandwidth usage during particular periods or for differing categories of data content.

Each CCN node also provides a set of network interfaces also referred to as "faces" over which CCN interest packets are received and forwarded and similarly over which CCN response packets are received and forwarded. In the example illustration the CCN node includes three network interfaces, which are faces 1, 2, and 3. These network interfaces can represent a physical link or a Layer 2 interface The network interfaces can also represent, in some embodiments, a transport protocol such as TCP/IP (in overlay mode) or even an application.

The basic data traffic forwarding in CCN is typically performed as explained below with an example sequence:
1. A CCN interest packet arrives through a face (network interface).
2. The CCN node checks whether it has the requested content object stored in its CS.
3. If the content object is found then goto step 7
4. If the content object is not found in the CS, then a check is made whether the same content has already been requested, by looking for a matching CCN name in the PIT.
5. If is a matching PIT entry is found, then update it by adding the network interface through which the CCN interest was received to the PIT entry. In this case, the process then exits.
6. If no matching PIT entry is found, then a new entry is created for the CCN name, and the CCN interest is forwarded toward the content provider according to CCN name prefix matching using the FIB.
7. When a content object arrives through a network interface in a CCN response packet, then forward the CCN response packet to each of the network interfaces listed in the related PIT entry. If the content object was found in the content store, then forward it to the network interface over which the corresponding CCN interest packet was received.

In the CCN networks of the prior art, the CCN networks are structured such that a single CCN node that can be referred to as a packet gateway performs the role of gateway to the CCN network, such as an access or operator network. In these architectures all the data traffic will go through this packet gateway. For instance, in mobile networks, as mentioned above, there is always a serving gateway and PDN gateway (also known as EPG, Evolved Packet Gateway) that are the only entry/exit points of the access network to other networks such as the Internet. This creates a single point for QoS enforcement, but at the same time this is a bottleneck for the network As shown above, in a CCN network, the requested content may already be cached close to the requesting user equipment, therefore the packet gateway in the prior art architecture may not see all per-user traffic and may not be able to enforce QoS appropriately because the CCN interests are being serviced by caching before they reach the packet gateway. Also, taking a home network as an example, the home network may have multiple users, each with different QoS profiles. As CCN packets do not identify the original sender, a QoS system deep in the network is not able to differentiate the parent's traffic from the child's traffic.

The QoS enforcement algorithm may be implemented in a manner similar to that implemented in a SASN where the algorithm has as input the time and size of the packet and generates as an output a value that is compared to the bandwidth limit that is configured for a user or subscriber. In some embodiments, the size used for the computation is the size of the response and not the size of the packet received as in current state of the art.

An example of this algorithm could be the following:

$$BW_{now} = \frac{BW_{before} * (T_{total} - T_{now})}{T_{total}} + \frac{P_{now}}{T_{now}}$$

Where: $BW_{now}$ is new bandwidth value that has been computed; $BW_{before}$ is a bandwidth in the previous measure that is stored in the QoS table; $T_{total}$ is total time to be compute the BW; $T_{now}$ is the time since the last packet arrived before the new packet. It is the result of current time minus the time of the arrival of the previous packet which is stored in the QoS table. $P_{now}$ is the size of the data traffic to be generated by the interest packet that has been received. In other embodiments, $P_{now}$ can be the size of the packet received in response to the interest packet.

This embodiments of the invention allows enforcing QoS in an Information-Centric Network such as a CCN network. The embodiments have advantages over the current art. The advantages of the embodiments include applying predictability of network load based on CCN request-response communication to optimize use of network resources, and giving additional importance to CCN caching in closer CCN nodes as content cached in these CCN nodes would not be otherwise computed for QoS enforcement.

The embodiments further overcome the disadvantages of the prior art such that the application of current QoS enforcement techniques is feasible in a CCN network in a more efficient process because the embodiment do not require that all traffic goes through internal QoS enforcement nodes and takes advantage of the CCN caching capability at the edges of the CCN network. The embodiments also provide a better utilization of resources because the embodiments implement QoS enforcement actions at the CCN gateways, before much of the data traffic is actually generated that would traverse the CCN network, saving bandwidth that can be used by other users and applications across the CCN network By implementing QoS at the edge of the CCN network, the embodiments provide a CCN network that benefits more from caching (e.g., reducing latency and network load) and provides better quality of services (i.e., in terms of latency and load) to adjoining networks.

Figure 3:
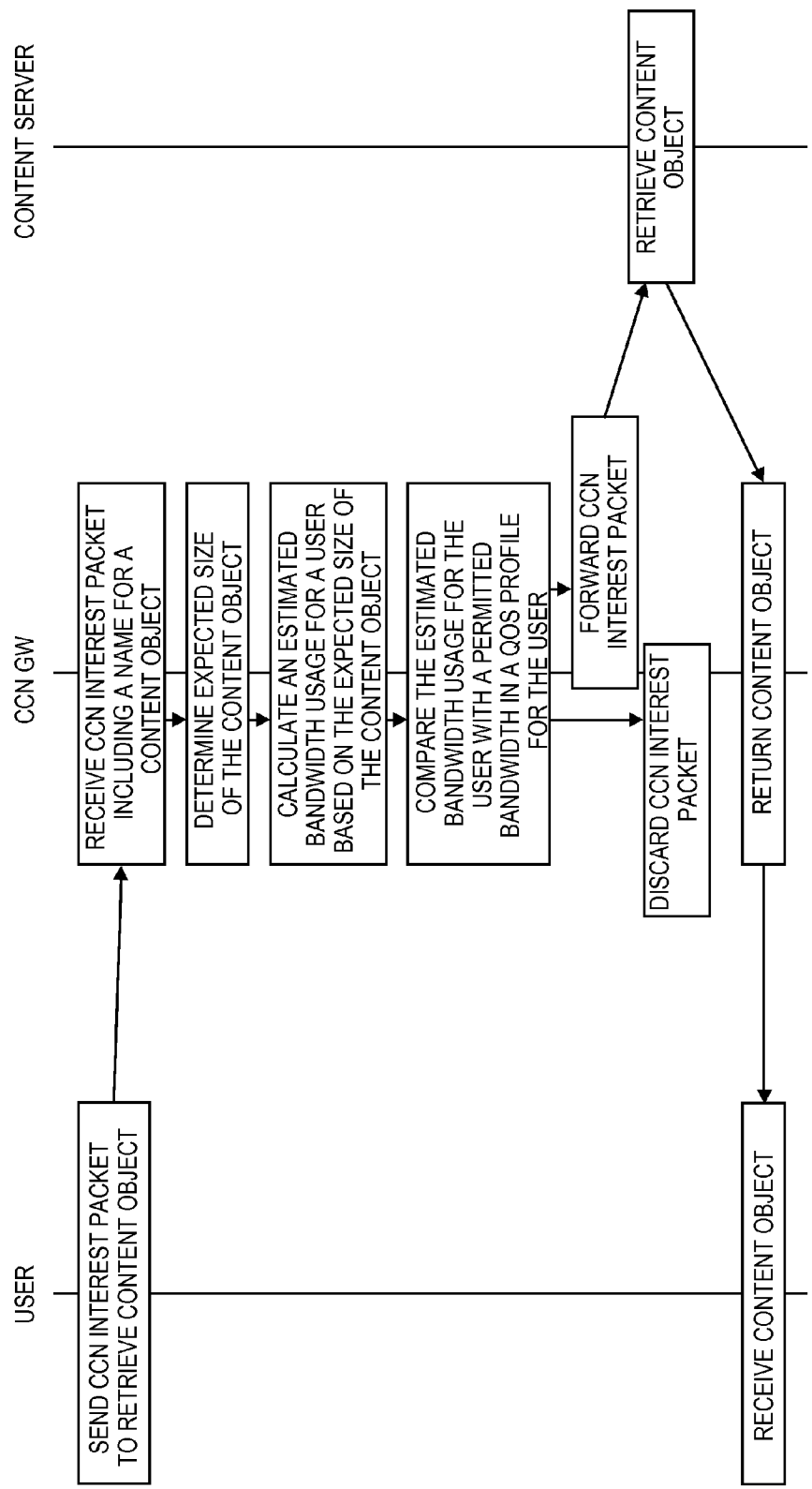
FIG. 3 is a timing diagram of one embodiment of a process for quality of service (QoS) enforcement.

FIG. 3 is a timing diagram of one embodiment of a process for QoS enforcement in the CCN network. The process begins with the user equipment generating and sending a CCN interest packet toward the content server to retrieve a specified content object. The CCN interest packet identifies the content object using a locally or globally unique name for the content object and/or by specifying the content server. The CCN interest packet traverses the residential network of the user equipment and is forwarded to the CCN gateway that connects the CCN network with the access gateway or some other intermediate gateway. The connection between the CCN network can traverse a residential network including a residential gateway or can traverse an access network such as a mobile network before reaching the CCN network.

The CCN gateway is the first node in the CCN network to service the CCN interest packet sent by the user equipment. The CCN gateway may inspect the CCN interest packet to determine what the name of the requested content object is and to determine how to forward the CCN interest packet toward a content provider. Based on the name of the content object an expected size of the content object or the response packets for the content object are determined. The expected size can be determined by a lookup of sizes for the content object based on previous requests for the content object or content objects having a similar origin or type. This information can be stored local to the CCN gateway such as in a QoS table or similar data structure. A length prediction module can be responsible for generating the estimated size of the content object or the CCN response packets to be expected for the CCN interest packet. In some embodiments, the content object may be stored local to the CCN gateway in a content store. In such cases the actual size of the content object can be determined from the content store.

Once the expected size of the content object or the response packets has been determined, then the calculation of an expected bandwidth usage for a user or subscriber can be determined. Any algorithm can be utilized for determining bandwidth usage. Further, other metrics related to connection resource usage can be utilized to monitor and enforce QoS policies in addition to per user bandwidth usage. In one example embodiment, the algorithm is the aforementioned equation:

$$BWnow = \frac{BWbefore * (Ttotal - Tnow)}{Ttotal} + \frac{Pnow}{Tnow}$$

With the bandwidth usage calculated, a QoS policy specific to the user or subscriber associated with the CCN interest packet can be retrieved and the bandwidth allowances for the user or subscriber determined. The QoS policy can specify any bandwidth usage threshold or similar metric threshold on a per user or per subscriber basis. If servicing the CCN interest packet would cause the user or subscriber to exceed the threshold then the process discards the CCN interest packet. However, if the servicing of the CCN interest packet does not cause the threshold to be exceeded then the CCN interest packet is processed by retrieving the content object from the local content store (not shown) or by forwarding the CCN interest packet to the content server. In some embodiments, a notice or response in case of the threshold being exceeded can be sent to the user equipment.

The content server receives the CCN interest packet and returns the requested content object via a set of response packets to the CCN gateway in route to the user equipment. The CCN gateway receives the response packets with the data of the requested content object and forwards them to the user equipment. For each new CCN interest this process can be re-executed. In some embodiments, a user or subscriber that has exceeded the threshold metric may be flagged to avoid having to re-execute the bandwidth and threshold comparison until a given time period associated with the QoS policy expires.

Figure 4:
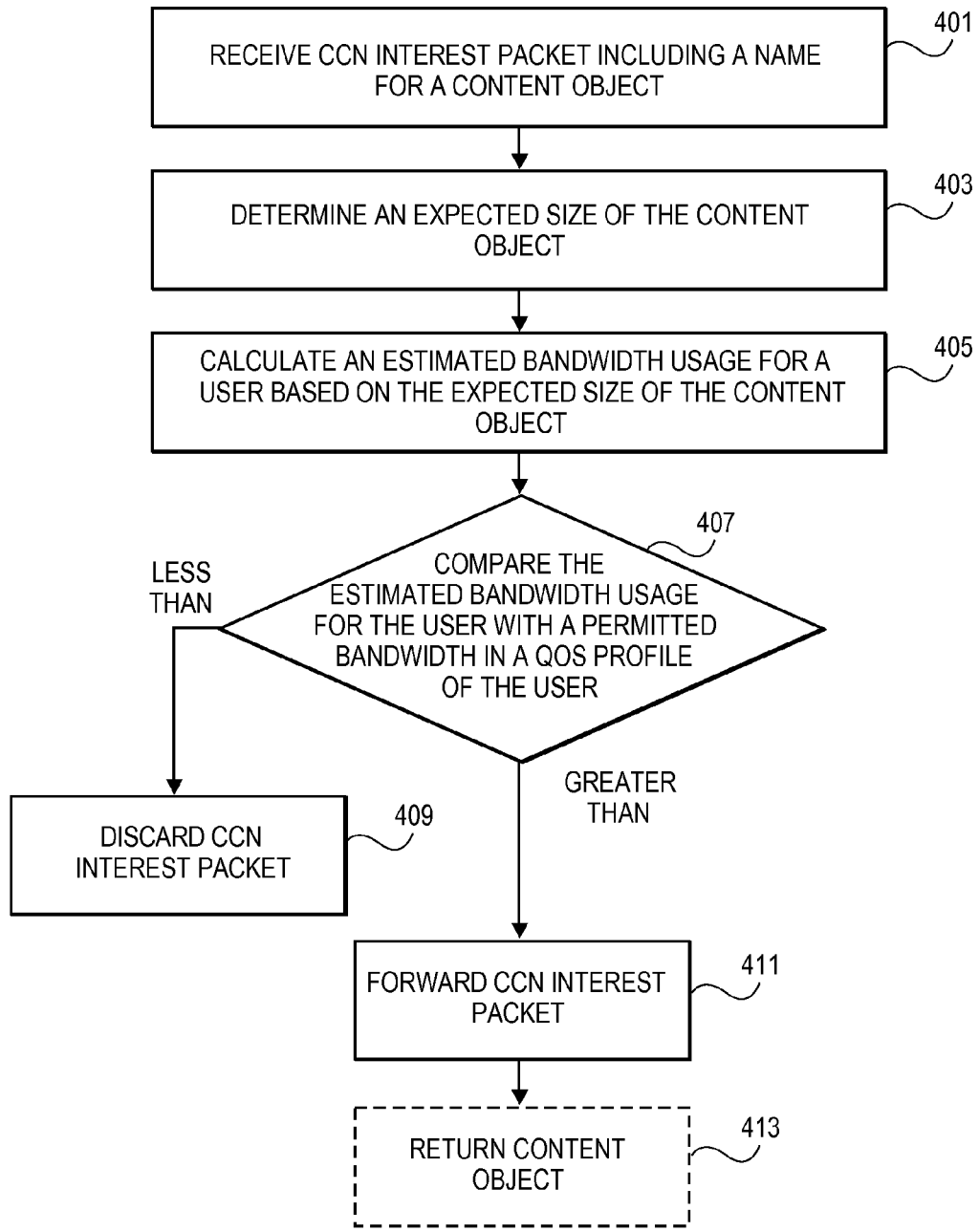
FIG. 4 is a flowchart of one embodiment of a process for QoS enforcement at a CCN gateway.

FIG. 4 is a flowchart of one embodiment of the QoS enforcement process as implemented by the CCN gateway. The process executed by CCN gateway is initiated in response to receiving a CCN interest packet over a network interface of the CCN gateway (Block 401). The CCN interest packet specifies a content object using a CCN name such as a uniform resource locator or similar format of name that is unique local to the CCN network or a content provider. The CCN interest packet can also identify a content provider separately or as part of the name for the content object. Thus, the CCN gateway may inspect the CCN interest packet to determine what the name of the requested content object is and to determine how to forward the CCN interest packet toward a content provider.

Using this CCN name the CCN gateway may determine an expected size of the content object or the response packets for the content object (Block 403). The expected size can be determined by a lookup of sizes for the content object based on previous requests for the content object or content objects having a similar origin or type. This information can be stored local to the CCN gateway such as in a QoS table or similar data structure. A length prediction module can be responsible for generating the estimated size of the content object or the CCN response packets to be expected for the CCN interest packet. In some embodiments, the content object may be stored local to the CCN gateway in a content store. In such cases the actual size of the content object can be determined from the content store.

The CCN gateway then calculates an estimated bandwidth usage for a user (or subscriber) based on the previously determined expected size of the content object or response packets (Block 405). As discussed above, any algorithm and any set of resource usage metrics can be utilized for determining bandwidth or data usage. A comparison can then be made between the estimated bandwidth usage for a user (or subscriber) and a permitted bandwidth in a QoS profile of the user (Block 407). The QoS profile for a user or subscriber can specify any bandwidth usage threshold or similar metric threshold on a per user or per subscriber basis. Similarly, the QoS profile can specify a more general QoS policy. The QoS profile or polices can be retrieved from AAA, RADIUS, Policy and Charging Rules Function (PCRF) or similar servers in the CCN network. In other embodiments this information is provided with the CCN interest packet or similarly provided.

If the estimated bandwidth exceeds the threshold, then the CCN gateway discards the CCN interest packet (Block 409), because servicing the CCN interest packet would cause the user or subscriber to exceed the QoS profile or policy. However, if the threshold is not exceeded then the CCN gateway proceeds by servicing the CCN interest packet by forwarding the CCN interest packet to the content provider over an interface of the CCN gateway identified by the FIB or similar forwarding table (Block 411). In other embodiments, the content object is instead retrieved from a local content of the CCN gateway. The CCN gateway subsequently receives the content object from the local content store (not shown) or in response to forwarding the CCN interest packet to the content server. In some embodiments, a notice or response in case of the threshold being exceeded can be sent to the user equipment.

The CCN gateway receives the response packets with the data of the requested content object and returns the content object in a set of response packets to the user equipment. (Block 413) For each new CCN interest this process can be re-executed. In some embodiments, a user or subscriber that has exceeded the threshold metric may be flagged to avoid having to re-execute the bandwidth and threshold comparison until a given time period associated with the QoS policy expires.

Architecture

Figure 5:
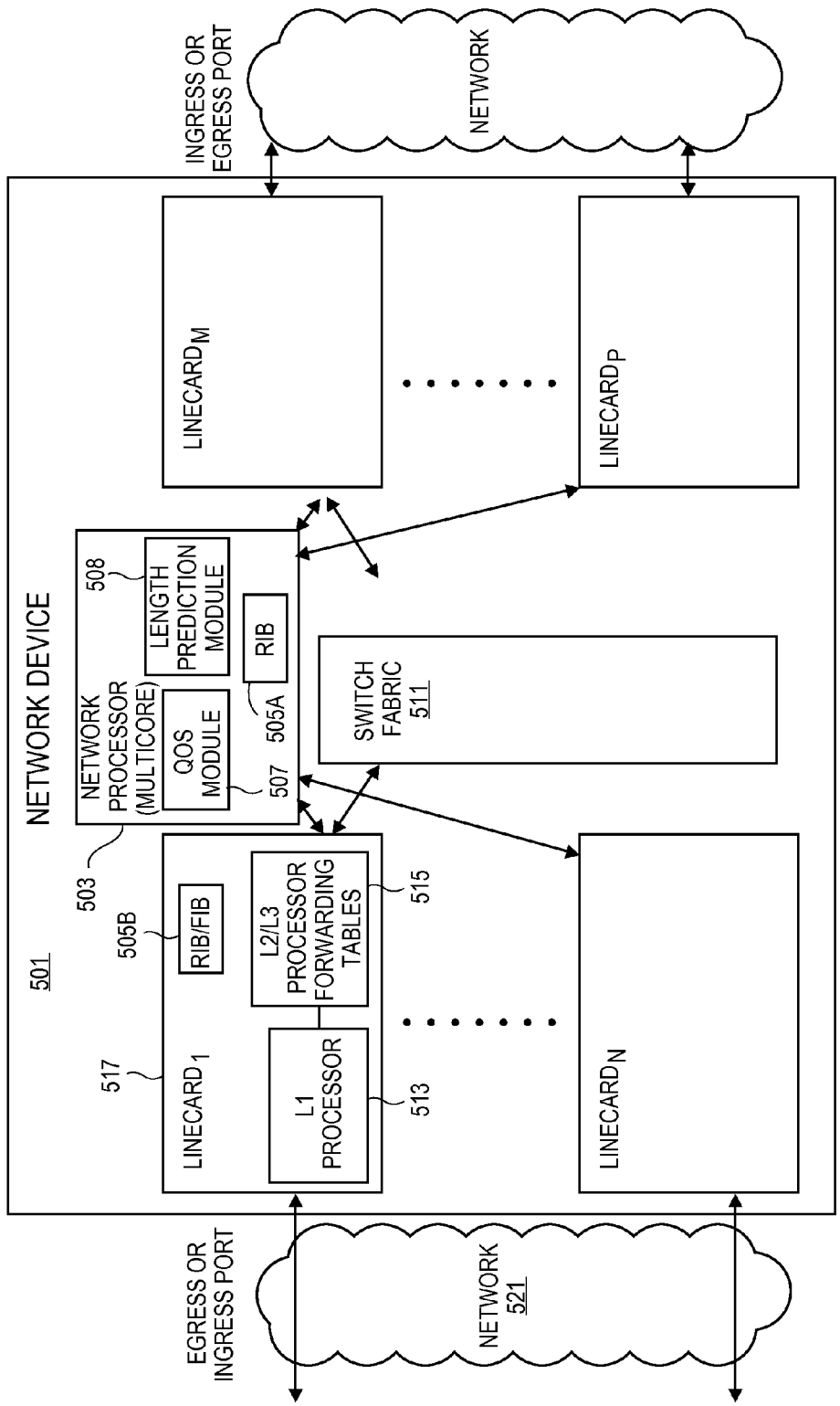
FIG. 5 is a diagram of one embodiment of a network device (ND) implementing a QoS enforcement process.

FIG. 5 is a diagram of one embodiment of a network device implementing the QoS enforcement system. A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

In one embodiment, the process is implemented by a network device 501 or similar computing device. The network device 501 can have any structure that enables it to receive data traffic and forward it toward its destination. The network device 501 can include a network processor 503 or set of network processors that execute the functions of the network device 501. A 'set,' as used herein, is any positive whole number of items including one item. The network device 501 can execute a QoS module 507 to implement the functions of QoS enforcement where the network device 501 functions as a CCN gateway as described herein above via a network processor 503 and can implement a length prediction module 508 to implement the prediction of the size of the content object and the associated set of response packets. The network device 501 connect with separately administered networks that have user equipment and/or content providers. The network processor 503 can implement the QoS module 507 and/or the length prediction module 508 as a discrete hardware, software module or any combination thereof. The network processor 503 can also service the routing information base 505A and similar functions related to data traffic forwarding and network topology maintenance. The routing information base 505A can be implemented as match action tables that are utilized for forwarding protocol data units PDUs (i.e. packets). The functions of the QoS module 507 and length prediction module 508 can be implemented as modules in any combination of software, including firmware, and hardware within the network device. The functions of the QoS module 507 and length prediction module 508 that are executed and implemented by the network device 501 include those described further herein above.

In one embodiment, the network device 501 can include a set of line cards 517 that process and forward the incoming data traffic toward the respective destination nodes by identifying the destination and forwarding the data traffic to the appropriate line card 517 having an egress port that leads to or toward the destination via a next hop. These line cards 517 can also implement the forwarding information base 505B, or a relevant subset thereof. The line cards 517 can also implement or facilitate the QoS module 507 and length prediction module 508 functions described herein above. The line cards 517 are in communication with one another via a switch fabric 511 and communicate with other nodes over attached networks 521 using Ethernet, fiber optic or similar communication links and media.

The operations of the flow diagrams have been described with reference to the exemplary embodiment of the block diagrams. However, it should be understood that the operations of the flowcharts can be performed by embodiments of the invention other than those discussed, and the embodiments discussed with reference to block diagrams can perform operations different from those discussed with reference to the flowcharts. While the flowcharts show a particular order of operations performed by certain embodiments, it should be understood that such order is exemplary (e.g., alternative embodiments may perform the operations in a different order, combine certain operations, overlap certain operations, etc.).

As described herein, operations performed by the network device 501 may refer to specific configurations of hardware such as application specific integrated circuits (ASICs) configured to perform certain operations or having a predetermined functionality, or software instructions stored in memory embodied in a non-transitory computer readable storage medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. One or more parts of an embodiment of the invention may be implemented using different combinations of software, firmware, and/or hardware.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) to establish network connections (to transmit and/or receive code and/or data using propagating signals) with other electronic devices. One or more parts of an embodiment of the invention may be implemented using different combinations of software, firmware, and/or hardware.

Figures 6A, 6B:
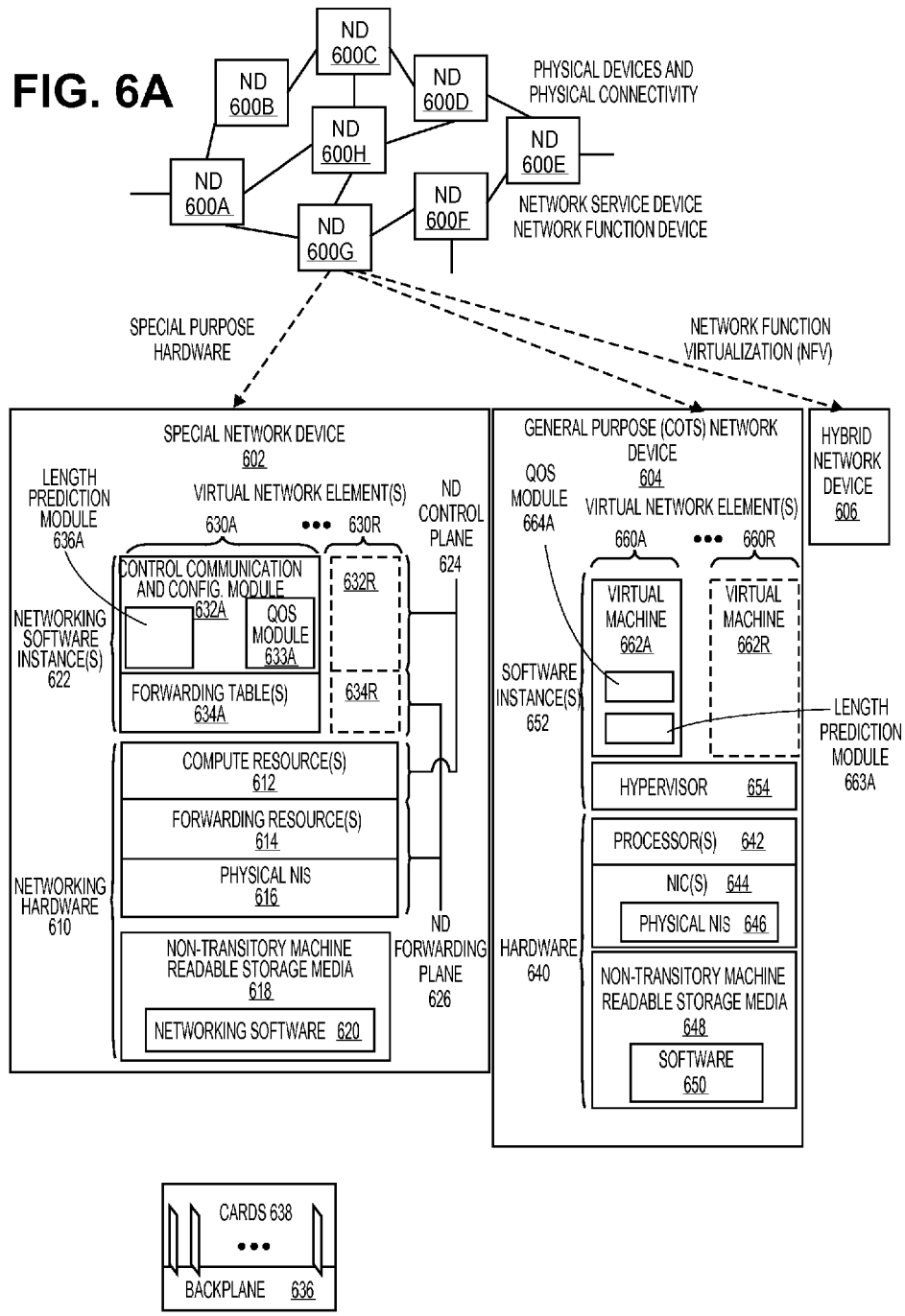
FIG. 6A illustrates connectivity between network devices (NDs) within an exemplary network, as well as three exemplary implementations of the NDs, according to some embodiments of the invention.
FIG. 6B illustrates an exemplary way to implement the special-purpose network device according to some embodiments of the invention.

FIG. 6A illustrates connectivity between network devices (NDs) within an exemplary network, as well as three exemplary implementations of the NDs, according to some embodiments of the invention. FIG. 6A shows NDs 600A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 600A, E, and F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 602 that uses custom application-specific integrated-circuits (ASICs) and a proprietary operating system (OS); and 2) a general purpose network device 604 that uses common off-the-shelf (COTS) processors and a standard OS.

The special-purpose network device 602 includes networking hardware 610 comprising compute resource(s) 612 (which typically include a set of one or more processors), forwarding resource(s) 614 (which typically include one or more ASICs and/or network processors), and physical network interfaces (NIs) 616 (sometimes called physical ports), as well as non-transitory machine readable storage media 618 having stored therein networking software 620. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 600A-H. During operation, the networking software 620 may be executed by the networking hardware 610 to instantiate a set of one or more networking software instance(s) 622. Each of the networking software instance(s) 622, and that part of the networking hardware 610 that executes that network software instance (be it hardware dedicated to that networking software instance and/or time slices of hardware temporally shared by that networking software instance with others of the networking software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A). In some embodiments, the control communication and configuration module 632A encompasses the QoS module 633A and length prediction module 636A as described herein above.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

The special-purpose network device 602 is often physically and/or logically considered to include: 1) a ND control plane 624 (sometimes referred to as a control plane) comprising the compute resource(s) 612 that execute the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) (i.e. implemented as match action tables) 634A-R and the physical NIs 616. By way of example, where the ND is a router (or is implementing routing functionality), the ND control plane 624 (the compute resource(s) 612 executing the control communication and configuration module(s) 632A-R) is typically responsible for participating in controlling how data (e.g., packets) are to be routed (e.g., the next hop for the data and the outgoing physical NI for that data) and storing that routing information in the forwarding table(s) 634A-R, and the ND forwarding plane 626 is responsible for receiving that data on the physical NIs 616 and forwarding that data out the appropriate ones of the physical NIs 816 based on the forwarding table(s) 634A-R.

FIG. 6B illustrates an exemplary way to implement the special-purpose network device 602 according to some embodiments of the invention. FIG. 6B shows a special-purpose network device including cards 838 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general purpose network device 604 includes hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein software 650. During operation, the processor(s) 642 execute the software 650 to instantiate a hypervisor 654 (sometimes referred to as a virtual machine monitor (VMM)) and one or more virtual machines 662A-R that are run by the hypervisor 654, which are collectively referred to as software instance(s) 652. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 662A-R, and that part of the hardware 640 that executes that virtual machine (be it hardware dedicated to that virtual machine and/or time slices of hardware temporally shared by that virtual machine with others of the virtual machine(s) 662A-R), forms a separate virtual network element(s) 660A-R. In some embodiments, the virtual machine module 662A encompasses QoS module 663A and length prediction module 664A.

The virtual network element(s) 660A-R perform similar functionality to the virtual network element(s) 630A-R. For instance, the hypervisor 654 may present a virtual operating platform that appears like networking hardware 610 to virtual machine 662A, and the virtual machine 662A may be used to implement functionality similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry standard high volume server hardware, physical switches, and physical storage, which could be located in Data centers, NDs, and customer premises equipment (CPE). However, different embodiments of the invention may implement one or more of the virtual machine(s) 662A-R differently. For example, while embodiments of the invention are illustrated with each virtual machine 662A-R corresponding to one VNE 660A-R, alternative embodiments may implement this correspondence at a finer level of granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 654 includes a virtual switch that provides similar forwarding services as a physical Ethernet switch. Specifically, this virtual switch forwards traffic between virtual machines and the NIC(s) 644, as well as optionally between the virtual machines 662A-R; in addition, this virtual switch may enforce network isolation between the VNEs 660A-R that by policy are not permitted to communicate with each other (e.g., by honoring virtual local area networks (VLANs)).

The third exemplary ND implementation in FIG. 6A is a hybrid network device 606, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 630A-R, VNEs 660A-R, and those in the hybrid network device 606) receives data on the physical NIs (e.g., 616, 646) and forwards that data out the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

Figure 6C:
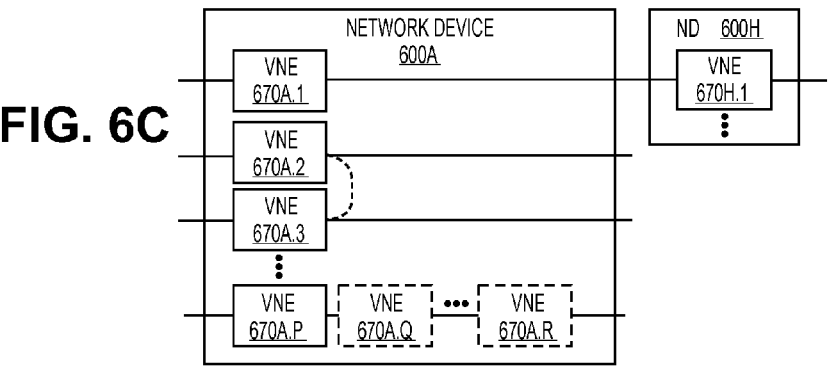
FIG. 6C illustrates various exemplary ways in which virtual network elements (VNEs) may be coupled according to some embodiments of the invention.

FIG. 6C illustrates various exemplary ways in which VNEs may be coupled according to some embodiments of the invention. FIG. 6C shows VNEs 670A.1-670A.P (and optionally VNEs 670A.Q-670A.R) implemented in ND 600A and VNE 670H.1 in ND 600H. In FIG. 6C, VNEs 670A.1-P are separate from each other in the sense that they can receive packets from outside ND 600A and forward packets outside of ND 600A; VNE 670A.1 is coupled with VNE 670H.1, and thus they communicate packets between their respective NDs; VNE 670A.2-670A.3 may optionally forward packets between themselves without forwarding them outside of the ND 600A; and VNE 670A.P may optionally be the first in a chain of VNEs that includes VNE 670A.Q followed by VNE 670A.R (this is sometimes referred to as dynamic service chaining, where each of the VNEs in the series of VNEs provides a different service —e.g., one or more layer 4-7 network services). While FIG. 6C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 6A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 6A may also host one or more such servers (e.g., in the case of the general purpose network device 604, one or more of the virtual machines 662A-R may operate as servers; the same would be true for the hybrid network device 606; in the case of the special-purpose network device 602, one or more such servers could also be run on a hypervisor executed by the compute resource(s) 612); in which case the servers are said to be co-located with the VNEs of that ND.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 6D:
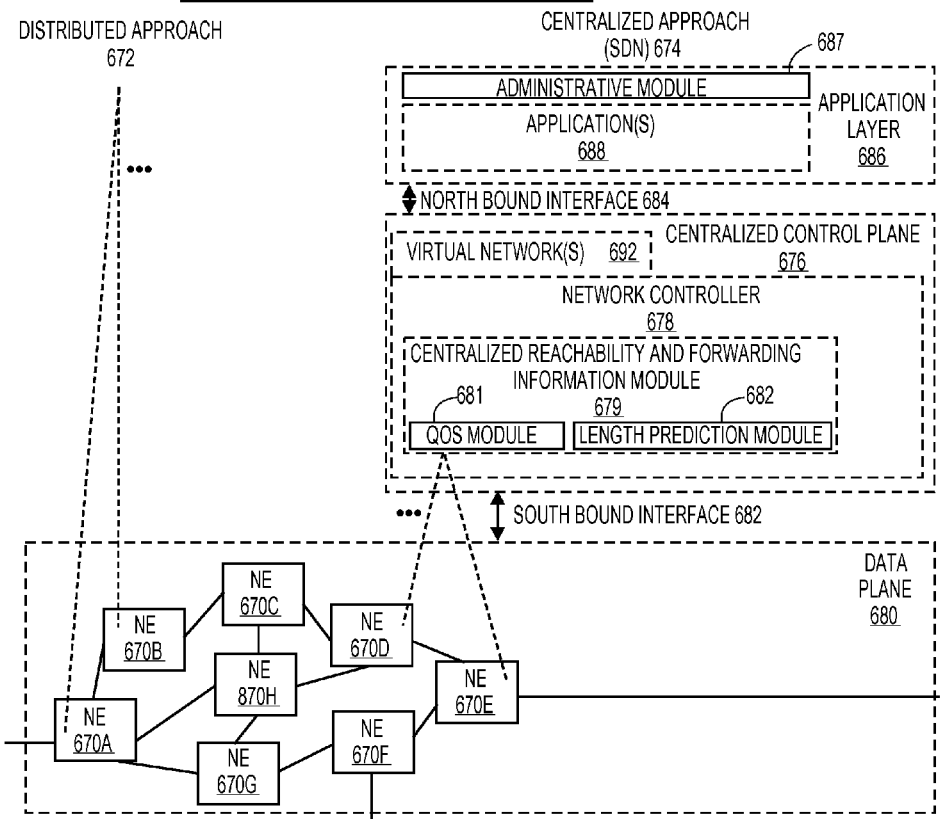
FIG. 6D illustrates a network with a single network element (NE) on each of the NDs of FIG. 6A.

FIG. 6D illustrates a network with a single network element on each of the NDs of FIG. 6A, and within this straight forward approach contrasts a traditional distributed approach (commonly used by traditional routers) with a centralized approach for maintaining reachability and forwarding information (also called network control), according to some embodiments of the invention. Specifically, FIG. 6D illustrates network elements (NEs) 670A-H with the same connectivity as the NDs 600A-H of FIG. 6A.

FIG. 6D illustrates that the distributed approach 672 distributes responsibility for generating the reachability and forwarding information across the NEs 670A-H; in other words, the process of neighbor discovery and topology discovery is distributed.

For example, where the special-purpose network device 602 is used, the control communication and configuration module(s) 632A-R of the ND control plane 624 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 670A-H (e.g., the compute resource(s) 612 executing the control communication and configuration module(s) 632A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 624. The ND control plane 624 programs the ND forwarding plane 626 with information (e.g., adjacency and route information) based on the routing structure(s). For example, the ND control plane 624 programs the adjacency and route information into one or more forwarding table(s) 634A-R that are implementations of match action tables (e.g., Forwarding Information Base (FIB), Label Forwarding Information Base (LFIB), and one or more adjacency structures) on the ND forwarding plane 626. For layer 2 forwarding, the ND can store one or more bridging tables that are used to forward data based on the layer 2 information in that data. While the above example uses the special-purpose network device 602, the same distributed approach 672 can be implemented on the general purpose network device 604 and the hybrid network device 606.

FIG. 6D illustrates that a centralized approach 674 (also known as software defined networking (SDN)) that decouples the system that makes decisions about where traffic is sent from the underlying systems that forwards traffic to the selected destination. The illustrated centralized approach 674 has the responsibility for the generation of reachability and forwarding information in a centralized control plane 676 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 676 has a south bound interface 682 with a data plane 680 (sometime referred to the infrastructure layer, network forwarding plane, or forwarding plane (which should not be confused with a ND forwarding plane)) that includes the NEs 670A-H (sometimes referred to as switches, forwarding elements, data plane elements, or nodes). The centralized control plane 676 includes a network controller 678, which includes a centralized reachability and forwarding information module 679 that determines the reachability within the network and distributes the forwarding information to the NEs 670A-H of the data plane 680 over the south bound interface 682 (which may use the OpenFlow protocol). Thus, the network intelligence is centralized in the centralized control plane 676 executing on electronic devices that are typically separate from the NDs.

For example, where the special-purpose network device 602 is used in the data plane 680, each of the control communication and configuration module(s) 632A-R of the ND control plane 624 typically include a control agent that provides the VNE side of the south bound interface 682. In this case, the ND control plane 624 (the compute resource(s) 612 executing the control communication and configuration module(s) 632A-R) performs its responsibility for participating in controlling how data (e.g., packets) is to be routed (e.g., the next hop for the data and the outgoing physical NI for that data) through the control agent communicating with the centralized control plane 676 to receive the forwarding information (and in some cases, the reachability information) from the centralized reachability and forwarding information module 679 (it should be understood that in some embodiments of the invention, the control communication and configuration module(s) 632A-R, in addition to communicating with the centralized control plane 676, may also play some role in determining reachability and/or calculating forwarding information—albeit less so than in the case of a distributed approach; such embodiments are generally considered to fall under the centralized approach 674, but may also be considered a hybrid approach). In some embodiments, the centralized reachability and forwarding module 679 encompasses QoS functions in corresponding QoS module 681 as described herein above as well as length predictions functions in corresponding length prediction module 682 as described herein above.

While the above example uses the special-purpose network device 602, the same centralized approach 674 can be implemented with the general purpose network device 604 (e.g., each of the VNE 660A-R performs its responsibility for controlling how data (e.g., packets) is to be routed (e.g., the next hop for the data and the outgoing physical NI for that data) by communicating with the centralized control plane 676 to receive the forwarding information (and in some cases, the reachability information) from the centralized reachability and forwarding information module 679; it should be understood that in some embodiments of the invention, the VNEs 660A-R, in addition to communicating with the centralized control plane 676, may also play some role in determining reachability and/or calculating forwarding information—albeit less so than in the case of a distributed approach) and the hybrid network device 606. In fact, the use of SDN techniques can enhance the NFV techniques typically used in the general purpose network device 604 or hybrid network device 606 implementations as NFV is able to support SDN by providing an infrastructure upon which the SDN software can be run, and NFV and SDN both aim to make use of commodity server hardware and physical switches.

FIG. 6D also shows that the centralized control plane 676 has a north bound interface 684 to an application layer 686, in which resides application(s) 688. The centralized control plane 676 has the ability to form virtual networks 692 (sometimes referred to as a logical forwarding plane, network services, or overlay networks (with the NEs 670A-H of the data plane 680 being the underlay network)) for the application(s) 688. Thus, the centralized control plane 676 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 6D shows the distributed approach 672 separate from the centralized approach 674, the effort of network control may be distributed differently or the two combined in certain embodiments of the invention. For example: 1) embodiments may generally use the centralized approach (SDN) 674, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 674, but may also be considered a hybrid approach.

While FIG. 6D illustrates the simple case where each of the NDs 600A-H implements a single NE 670A-H, it should be understood that the network control approaches described with reference to FIG. 6D also work for networks where one or more of the NDs 600A-H implement multiple VNEs (e.g., VNEs 630A-R, VNEs 660A-R, those in the hybrid network device 606). Alternatively or in addition, the network controller 678 may also emulate the implementation of multiple VNEs in a single ND. Specifically, instead of (or in addition to) implementing multiple VNEs in a single ND, the network controller 678 may present the implementation of a VNE/NE in a single ND as multiple VNEs in the virtual networks 692 (all in the same one of the virtual network(s) 692, each in different ones of the virtual network(s) 692, or some combination). For example, the network controller 678 may cause an ND to implement a single VNE (a NE) in the underlay network, and then logically divide up the resources of that NE within the centralized control plane 676 to present different VNEs in the virtual network(s) 692 (where these different VNEs in the overlay networks are sharing the resources of the single VNE/NE implementation on the ND in the underlay network).

Figure 6E:
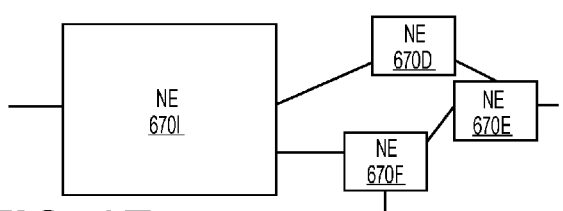
FIG. 6E illustrates an example where each of the NDs implements a single NE (see FIG. 6D), but the centralized control plane has abstracted multiple of the NEs in different NDs into a single NE in one of the virtual network(s) of FIG. 6D, according to some embodiments of the invention.
Figure 6F:
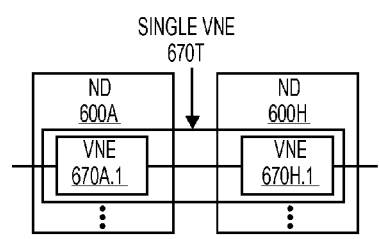
FIG. 6F illustrates a case where multiple VNEs are implemented on different NDs and are coupled to each other, and where the centralized control plane has abstracted these multiple VNEs such that they appear as a single VNE within one of the virtual networks of FIG. 6, according to some embodiments of the invention.

On the other hand, FIGS. 6E and 6F respectively illustrate exemplary abstractions of NEs and VNEs that the network controller 678 may present as part of different ones of the virtual networks 692. FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 6701 in one of the virtual network(s) 692 of FIG. 6D, according to some embodiments of the invention. FIG. 6E shows that in this virtual network, the NE 6701 is coupled to NE 670D and 670F, which are both still coupled to NE 670E.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments of the invention. Thus, the abstraction of a NE or VNE can span multiple NDs.

While some embodiments of the invention implement the centralized control plane 676 as a single entity (e.g., a single instance of software running on a single electronic device), alternative embodiments may spread the functionality across multiple entities for redundancy and/or scalability purposes (e.g., multiple instances of software running on different electronic devices).

Figure 7:
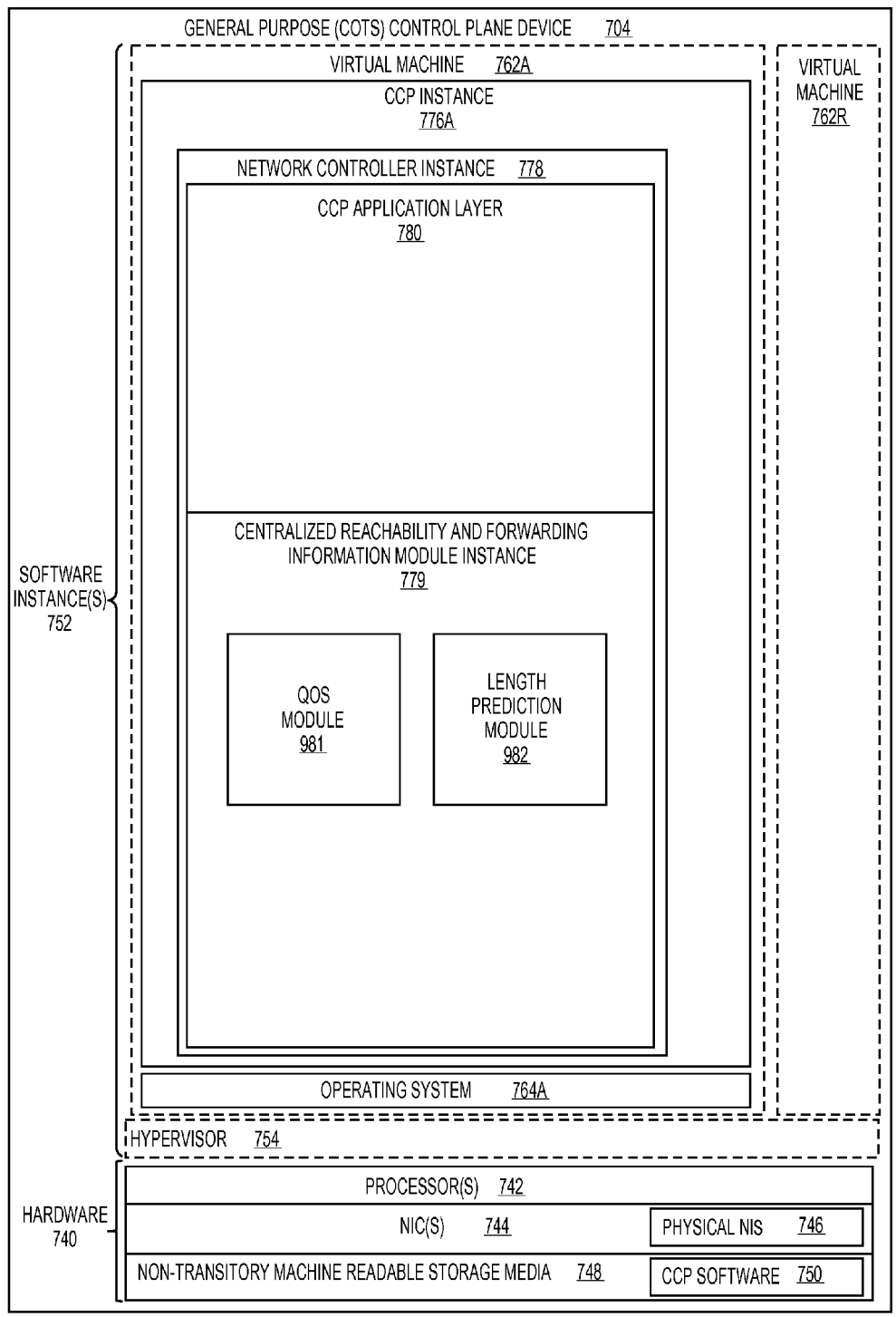
FIG. 7 illustrates a general purpose control plane device including hardware comprising a set of one or more processor(s) (which are often Commercial off-the-shelf (COTS) processors) and network interface controller(s) (NICs; also known as network interface cards) (which include physical NIs), as well as non-transitory machine readable storage media having stored therein centralized control plane (CCP) software), according to some embodiments of the invention.

Similar to the network device implementations, the electronic device(s) running the centralized control plane 676, and thus the network controller 678 including the centralized reachability and forwarding information module 679, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 7 illustrates, a general purpose control plane device 704 including hardware 740 comprising a set of one or more processor(s) 742 (which are often COTS processors) and network interface controller(s) 744 (NICs; also known as network interface cards) (which include physical NIs 746), as well as non-transitory machine readable storage media 748 having stored therein centralized control plane (CCP) software 750.

In embodiments that use compute virtualization, the processor(s) 742 typically execute software to instantiate a hypervisor 754 (sometimes referred to as a virtual machine monitor (VMM)) and one or more virtual machines 762A-R that are run by the hypervisor 754; which are collectively referred to as software instance(s) 752. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation an instance of the CCP software 750 (illustrated as CCP instance 776A) on top of an operating system 764A are typically executed within the virtual machine 762A. In embodiments where compute virtualization is not used, the CCP instance 776A on top of operating system 764A is executed on the "bare metal" general purpose control plane device 704.

The operating system 764A provides basic processing, input/output (I/O), and networking capabilities. In some embodiments, the CCP instance 776A includes a network controller instance 778. The network controller instance 778 includes a centralized reachability and forwarding information module instance 779 (which is a middleware layer providing the context of the network controller 778 to the operating system 764A and communicating with the various NEs), and an CCP application layer 780 (sometimes referred to as an application layer) over the middleware layer (providing the intelligence required for various network operations such as protocols, network situational awareness, and user-interfaces). At a more abstract level, this CCP application layer 780 within the centralized control plane 776 works with virtual network view(s) (logical view(s) of the network) and the middleware layer provides the conversion from the virtual networks to the physical view. The CCP application can encompass the functionality of QoS module 781 and the length prediction module 782 as described herein above.

The centralized control plane 776 transmits relevant messages to the data plane 780 based on CCP application layer 780 calculations and middleware layer mapping for each flow. A flow may be defined as a set of packets whose headers match a given pattern of bits; in this sense, traditional IP forwarding is also flow—based forwarding where the flows are defined by the destination IP address for example; however, in other implementations, the given pattern of bits used for a flow definition may include more fields (e.g., 10 or more) in the packet headers. Different NDs/NEs/VNEs of the data plane 780 may receive different messages, and thus different forwarding information. The data plane 780 processes these messages and programs the appropriate flow information and corresponding actions in the forwarding tables (sometimes referred to as flow tables) of the appropriate NE/VNEs, and then the NEs/VNEs map incoming packets to flows represented in the forwarding tables and forward packets based on the matches in the forwarding tables.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present invention may be carried out in other specific ways than those herein set forth without departing from the scope and essential characteristics of the invention. One or more of the specific processes discussed above may be carried out using one or more appropriately configured processing circuits. In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The invention claimed is:

1. A method for enforcing quality of service (QOS) for accessing content objects on a per user basis at a content centric networking (CCN) gateway in a CCN network, the method comprising the steps of:
receiving a CCN interest packet including a name for a content object from a user equipment;
determining an expected size of the content object;
calculating an estimated bandwidth usage for a user based on the expected size of the content object;
comparing the estimated bandwidth usage for the user with a permitted bandwidth in a QOS profile of the user; and
processing the CCN interest packet, in response to the estimated bandwidth being less than the permitted bandwidth in the QOS profile of the user.

2. The method of claim 1, further comprising the step of:
discarding the content object in response to estimated bandwidth being more than the permitted bandwidth in the QOS profile of the user.

3. The method of claim 1, wherein processing the CCN interest packet comprises the step of:
forwarding the CCN interest packet to a content provider.

4. The method of claim 1, wherein processing the CCN interest packet comprises the step of:
retrieving the content object identified by the CCN interest packet from a local content store.

5. The method of claim 1, wherein determining the expected size of the content object comprises the step of:
looking up a prefix of the name of the content object in a table of response sizes.

6. A network device implementing a method for enforcing quality of service (QOS) for accessing content objects on a per user basis at a content centric networking (CCN) gateway in a CCN network, the network device comprising:
a non-transitory computer-readable medium having stored therein a length prediction module and a QOS module; and
a network processor coupled to the non-transitory computer-readable medium, the network processor configured to execute the length prediction module and the QOS module, the QOS module configured to receive a CCN interest packet including a name for a content object from a user equipment, the length prediction module configured to determine an expected size of the content object, the QOS module further configured to calculate an estimated bandwidth usage for a user based on the expected size of the content object, to compare the estimated bandwidth usage for the user with a permitted bandwidth in a QOS profile of the user, and to process the CCN interest packet, in response to the estimated bandwidth being less than the permitted bandwidth in the QOS profile of the user.

7. The network device of claim 6, wherein the QOS module is further configured to discard the content object in response to estimated bandwidth being more than the permitted bandwidth in the QOS profile of the user.

8. The network device of claim 6, wherein processing the CCN interest packet by the QOS module further includes forwarding the CCN interest packet to a content provider.

9. The network device of claim 6, wherein processing the CCN interest packet by the QOS module further includes retrieving the content object identified by the CCN interest packet from a local content store.

10. The network device of claim 6, wherein the length prediction module is further configured to look up a prefix of the name of the content object in a table of response sizes.

11. A computing device implementing a plurality of virtual machines for implementing network function virtualization (NFV), wherein a virtual machine from the plurality of virtual machines is configured to execute a method for enforcing quality of service (QOS) for accessing content objects on a per user basis at a content centric networking (CCN) gateway in a CCN network, the computing device comprising:
a non-transitory computer-readable medium having stored therein a length prediction module and a QOS module; and
a processor coupled to the non-transitory computer-readable medium, the processor configured to execute the virtual machine, the virtual machine configured to execute the length prediction module and the QOS module, the QOS module configured to receive a CCN interest packet including a name for a content object from a user equipment, the length prediction module configured to determine an expected size of the content object, the QOS module further configured to calculate an estimated bandwidth usage for a user based on the expected size of the content object, to compare the estimated bandwidth usage for the user with a permitted bandwidth in a QOS profile of the user, and to process the CCN interest packet, in response to the estimated bandwidth being less than the permitted bandwidth in the QOS profile of the user.

12. The computing device of claim 11, wherein the QOS module is further configured to discard the content object in response to estimated bandwidth being more than the permitted bandwidth in the QOS profile of the user.

13. The computing device of claim 11, wherein processing the CCN interest packet by the QOS module further includes forwarding the CCN interest packet to a content provider.

14. The computing device of claim 11, wherein processing the CCN interest packet by the QOS module further includes retrieving the content object identified by the CCN interest packet from a local content store.

15. The computing device of claim 11, wherein the length prediction module is further configured to look up a prefix of the name of the content object in a table of response sizes.

16. A control plane device to implement at least one centralized control plane for a software defined network (SDN), the centralized control plane configured to execute a method for enforcing quality of service (QOS) for accessing content objects on a per user basis at a content centric networking (CCN) gateway in a CCN network, the control plane device comprising:
a non-transitory computer-readable medium having stored therein a length prediction module and a QOS module; and
a processor coupled to the non-transitory computer-readable medium, the processor configured to execute the length prediction module and the QOS module, the QOS module configured to receive a CCN interest packet including a name for a content object from a user equipment, the length prediction module configured to determine an expected size of the content object, the QOS module further configured to calculate an estimated bandwidth usage for a user based on the expected size of the content object, to compare the estimated bandwidth usage for the user with a permitted bandwidth in a QOS profile of the user, and to process the CCN interest packet, in response to the estimated bandwidth being less than the permitted bandwidth in the QOS profile of the user.

17. The control plane device of claim 16, wherein the QOS module is further configured to discard the content object in response to estimated bandwidth being more than the permitted bandwidth in the QOS profile of the user.

18. The control plane device of claim 16, wherein processing the CCN interest packet by the QOS module further includes forwarding the CCN interest packet to a content provider.

19. The control plane device of claim 16, wherein processing the CCN interest packet by the QOS module further includes retrieving the content object identified by the CCN interest packet from a local content store.

20. The control plane device of claim 16, wherein the length prediction module is further configured to look up a prefix of the name of the content object in a table of response sizes.

* * * * *